United States Patent
Sjönell

(10) Patent No.: US 6,744,353 B2
(45) Date of Patent: Jun. 1, 2004

(54) BLIND SPOT DETECTOR

(76) Inventor: Göran Sjönell, Askrikevägen 11, Lidingö 181 46 (SE)

( * ) Notice: Subject to any disclaimer, the term of this patent is extended or adjusted under 35 U.S.C. 154(b) by 84 days.

(21) Appl. No.: 10/149,573

(22) PCT Filed: Dec. 15, 2000

(86) PCT No.: PCT/SE00/02564
§ 371 (c)(1),
(2), (4) Date: Sep. 18, 2002

(87) PCT Pub. No.: WO01/45067
PCT Pub. Date: Jun. 21, 2001

(65) Prior Publication Data
US 2003/0052773 A1 Mar. 20, 2003

(30) Foreign Application Priority Data
Dec. 15, 1999 (SE) ................................ 9904591

(51) Int. Cl.⁷ ................................ B60Q 1/00
(52) U.S. Cl. ................ 340/435; 340/436; 340/438; 340/903
(58) Field of Search ................ 340/435, 436, 340/438, 903, 904, 909, 943; 701/300, 301, 41; 180/167, 168, 169; 342/70, 71

(56) References Cited

U.S. PATENT DOCUMENTS

| | | | |
|---|---|---|---|
| 3,568,144 A | 3/1971 | Streb | |
| 3,732,536 A | 5/1973 | Larka et al. | |
| 5,793,325 A * | 8/1998 | Yamada | 342/70 |
| 5,929,785 A * | 7/1999 | Satonaka | 340/903 |
| 6,157,892 A * | 12/2000 | Hada et al. | 340/436 |
| 6,246,949 B1 * | 6/2001 | Shirai et al. | 701/301 |
| 6,269,307 B1 * | 7/2001 | Shinmura et al. | 340/435 |
| 6,281,786 B1 * | 8/2001 | Adachi et al. | 340/435 |

FOREIGN PATENT DOCUMENTS

| | | |
|---|---|---|
| DE | 2143406 | 8/1972 |
| DE | 2455733 A1 | 5/1976 |
| EP | 0370965 A2 | 5/1990 |
| GB | 2265744 | 10/1993 |
| GB | 2283874 A | 5/1995 |
| WO | WO 90/13103 A1 | 11/1990 |
| WO | WO 95/25322 | 9/1995 |
| WO | WO 9834131 A1 | 8/1998 |

OTHER PUBLICATIONS

JP 9132094 A (Nissan Motor Co. Ltd), May 20, 1997 (abstract).
JP 9132094 (Nissan Motor Co. Ltd), Sep. 30, 1997 (abstract).

* cited by examiner

*Primary Examiner*—Van T. Trieu
(74) *Attorney, Agent, or Firm*—Ware, Fressola, Van der Sluys & Adolphson LLP

(57) ABSTRACT

A warning device for mounting onto a vehicle, in order to attract the attention of the driver when another vehicle (2) or object is located in a position that is wholly or partially critical for the driver. The device comprises two sources (5, 6) of laser radiation arranged at a distance from each other, a convex lens (8) arranged outside of each source and a position-sensitive radiation detector (7) arranged between the sources (5, 6). The device reacts with different levels of warning signals on the detection of direction indicator (58), angular deviation (60) of a wheel or the steering wheel, speed (62), etc., in combination.

16 Claims, 4 Drawing Sheets

BLIND SPOT DETECTOR

TECHNICAL FIELD

The present invention concerns a warning device for mounting onto a vehicle, in order to attract the driver's attention by means of a signal when an object is located in a position that is wholly or partially critical for the driver.

BACKGROUND ART

When, for example, a second vehicle is located in a position diagonally behind "one's own" vehicle, normally in a position diagonally behind one's own vehicle relative to the position of the driving seat, it can be difficult to perceive the second vehicle in the rear-view mirror, even if this is correctly aligned. It becomes even more difficult if the mirror is somewhat wrongly aligned. Furthermore, the construction of the vehicle normally prevents the peripheral vision of the eye from perceiving the second vehicle when the driver looks in the rear-view mirror. A further factor that makes it difficult to discover the second vehicle in this position is the stress to which the vehicle driver is exposed when driving in heavy traffic, with the requirement for repeated lane-changes, as is particularly the case in city traffic.

The Swedish patent application 9700276-0 (also published as WO 98/34131) submitted by the same applicant as the present application specifies a warning device for mounting onto a vehicle in order to attract the driver's attention by means of a signal when an object is located in a position that is critical for the driver. The device comprises two sources of laser radiation arranged at a distance from each other, a convex lens arranged outside of each source, and a position-sensitive radiation detector arranged between the sources, outside of which is also arranged a convex lens. The sources and the detector are part of an integrated current circuit with the sources modulated to be activated with a phase displacement and the beams from the sources are adjusted to intersect each other at a predetermined distance from the device.

Other more or less sophisticated devices are available to warm the driver about other vehicles that are present in the said "blind spot", that is, diagonally behind one's own vehicle.

The following documents, U.S. Pat. Nos. 3,732,536; 3,568,144; GB 22 65 744 and WO 95/25322, are a selection of those that concern vehicle detection devices for detecting the presence of a vehicle within the said "blind spot", that is, diagonally behind the vehicle that possesses the said device, by the use of passive ultrasound reception or heat-detection (IR) arrangements. The components that are part of the arrangements are often arranged at different locations on the vehicles. Against the background of the surrounding background radiation noise, it is essentially impossible to make this type of equipment reliable as a warning device of the intended type.

A device is revealed in DE-2455733 for the measurement of the relative distance to an object that determines the distance to the object independently of whether the object is close to or far from the device.

Devices equipped with active search means for the discovery of a second vehicle diagonally behind one's own are also known. These active search means thus consist of some type of transmitter of pulses and receivers for the reception of echoes, which are obtained if the pulses impinge upon an object in their pathway. Examples of such devices are shown in DE-21 43 406 and in EP 0 370 965 A2, which devices use Doppler radar. The complexity of these known devices and the relatively high costs that are thus associated with them, combined with a large risk for interruptions in service, have resulted in these known warning devices not having found a market. There is a large risk that false echoes are received.

A warning device is known through GB 2283874 that attracts the driver's attention, for example, through sensing the direction indicator and the angle of the wheels through sensors for the same.

The document WO 9013103 displays a warning device for attracting the attention of the driver of a vehicle in which detectors are arranged at the rear or side sections of a vehicle, and where the vehicle is a lorry.

A warning device for attracting the attention of the driver of a vehicle that takes the speed of the vehicle into consideration is known through the document JP 9132094 through Derwents' abstract 1997-328064.

However, none of the above-mentioned documents describe a warning device in the form of a rear-view mirror for vehicles that emits a signal with the status of a warning with respect to sensors for the direction indicators, deviation of wheel angle, threshold detection of the speed of the vehicle in combination with input signals from other sensors.

Further, it is desirable that the vehicle does not emit a warning signal during normal turning in, for example, a roundabout or when turning corners to the right or left.

SUMMARY OF THE DESCRIBED INVENTION

The present invention involves a warning device that draws the driver's attention to the critical position of second vehicle or object relative to the vehicle of the driver, without the position determination being disturbed by background noise or sunlight—background light—, while at the same time being reliable and easy to keep clean.

A warning device according to the present invention will with very great probability save many lives and prevent or guard against traffic injuries. The problem of what is known as the "blind spot" is one to which motorists are exposed every day.

There is currently no warning device in the form of a rear-view mirror that is sufficiently advanced to take into consideration all of the sensor outputs, at one and the same time, that are described in the three documents GB 2283874, WO 9013103 and JP 9132094, and that in addition takes into account that an alarm is not to be emitted when turning a corner.

Hereby the present invention specifies a warning device in the form of a rear-view mirror for mounting onto a vehicle, in order to attract the driver's attention by means of a signal when an object is located in a position that is wholly or partially critical for the driver. The device comprises at least one source of electromagnetic radiation or ultrasound together with an arranged position-sensitive radiation- or sound detector.

The source and the detector are parts of an electronic circuit, whereby the detector detects the presence of an object in a position that is critical for the driver. One output in the circuit for a first signal with the status of a warning is activated, whereby a first-level warning signal is emitted.

The electronic circuit for the warning device comprises the following sensor means with associated outputs for the activation of signals with the status of a warning:

sensor means for detection of an input signal on/off from the direction indicators of the vehicle;

output in the circuit for activation of a signal with the status of a warning when the input signal of the direction indicator is on;

sensor devices that detect an angular deviation of one of the wheels of the vehicle;

outputs in the circuit for activation of a signal with the status of a warning when the warning signal is emitted for angular deviation;

means for determining the speed of the vehicle; and threshold detection means for speeds, whereby predetermined threshold values of speed emit a signal with the status of a warning in combination with input signals from sensor means in the direction of motion of the vehicle depending on the detection by the sensor means and that a maximum angular deviation is specified, which determines that the vehicle is turning a corner, turning left or right, etc.

In one embodiment of the invention, a further level of signals with the status of a warning is achieved with the sensor means for the direction indicator.

Another embodiment of the invention specifies that a further level of signals with the status of a warning is achieved with the sensor means for angular deviation.

Yet another embodiment specifies that a further level of signals with the status or a warning is achieved with sensor means and detection of speed depending on the threshold value.

The detection of speed is deactivated in one embodiment of the invention when the speed falls below a predetermined minimum speed.

If the speed of the vehicle is lower than a predetermined maximum speed, a further level is activated according to one embodiment of the invention for change of lane or overtaking through detection from sensor means for the direction indicators and/or angular deviation.

A further embodiment of the invention specifies that a further level is activated if the detection of angular deviation is greater than a predetermined angle when the speed is greater than a predetermined minimum speed.

If the speed of the vehicle is greater than a predetermined maximum speed, a further level is activated when the sensor means for direction indicators detects that the input signal is on, in one embodiment of the invention. A further level is activated in one embodiment when the sensor means detects an angular deviation.

In one preferred embodiment of the device, it is contained within a rear-view mirror for a vehicle. The rear-view mirror contains a battery for the operation of the device in a further embodiment of the invention.

The detector is mounted in one embodiment of the invention on the rear section of the vehicle. The detector is mounted in a rear-view mirror and a further detector is mounted on the rear section of a vehicle according to one embodiment in which the detectors collaborate in order to detect reflected signals that are received.

A further embodiment includes the mounting on the side section of a vehicle of at least one detector for the detection of reflected signals.

The vehicle in one embodiment with detectors mounted on the side or rear sections is a truck or similar vehicle.

BRIEF DESCRIPTION OF THE DRAWINGS

The invention will hereunder be described in the present description with reference to the attached drawings in order to gain a better understanding of its embodiments, where.

DETAILED DESCRIPTION OF PREFERRED EMBODIMENTS

FIGS. 1–4 below describe the prior art as it is known from the published Swedish patent application with application number 9700276-0, from the same applicant as the present application.

Figure 1:
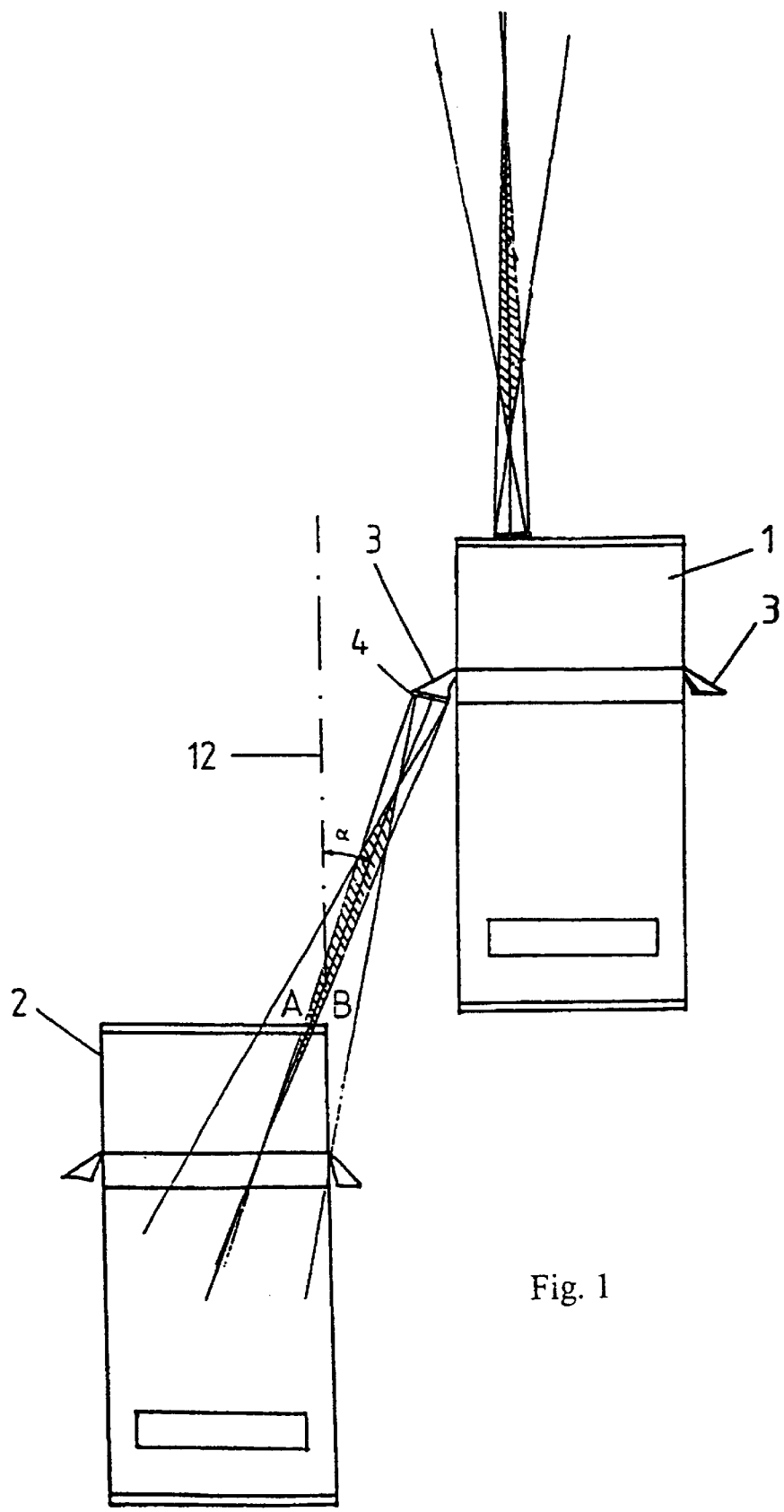
FIG. 1 shows schematically two vehicles, whereby the leading vehicle is equipped with a warning device mounted onto a rear-view mirror according to the prior art.
Figure 2:
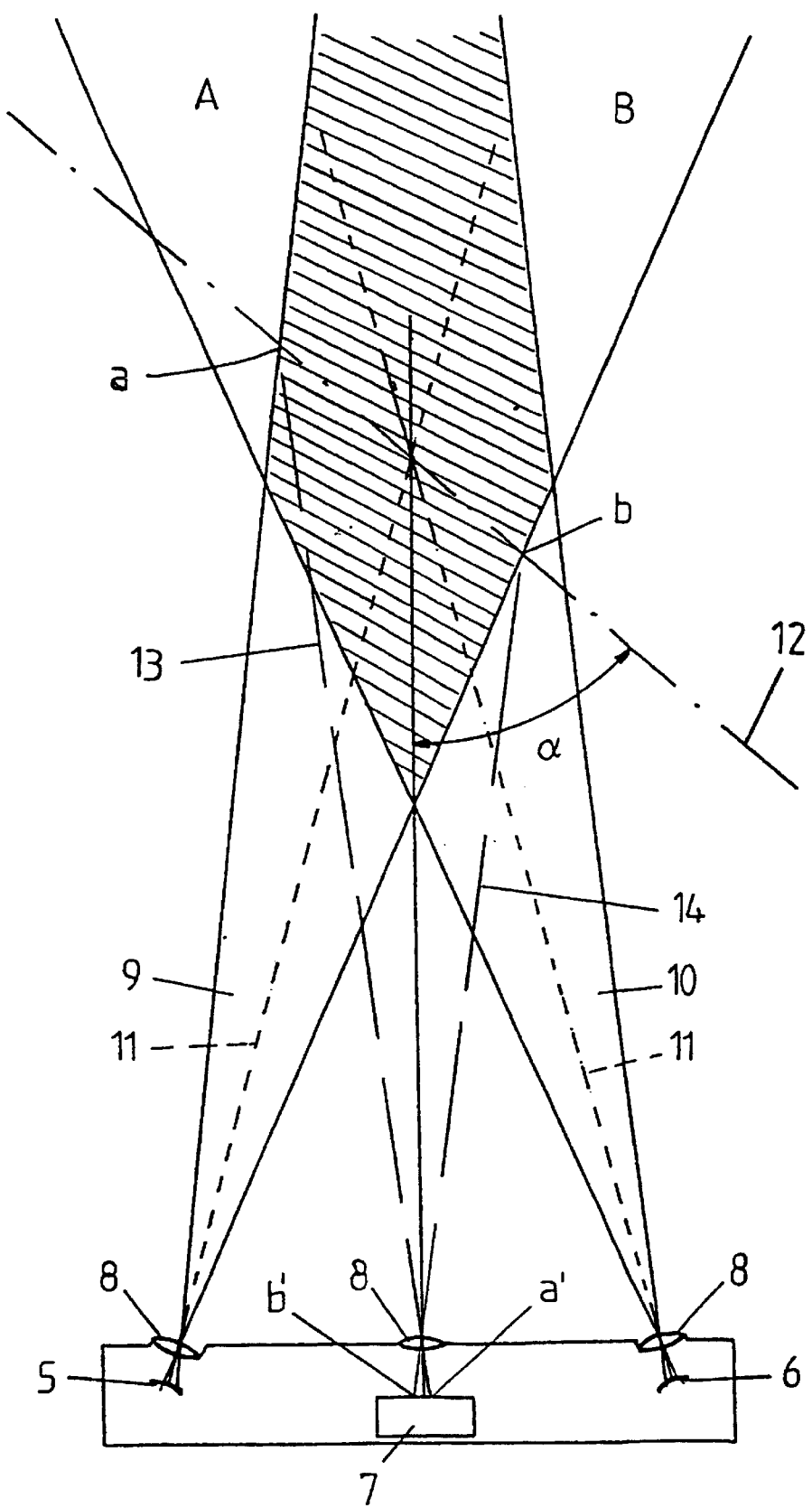
FIG. 2 shows at a larger scale and very schematically the warning device according to the prior art.

In FIG. 1, 1 and 2 denote a first and a second vehicle, respectively, whereby the second vehicle 2 is located diagonally behind to the left of the first vehicle 1. This position of the second vehicle 2 is critical for the driver of the first vehicle 1, since he or she will have great difficulty in discovering the second vehicle 2 in the rear-view mirrors of the vehicle, as has been suggested in the introduction to the description of the patent. The external rear-view mirrors of the vehicle 1 are denoted by 3. The warning device according to the invention is shown in more detail in FIG. 2, which shows very schematically the principle of the invention. It is to be appreciated that the scale and the geometry of FIG. 2 are distorted in comparison with FIG. 1, in order to make the principle clearer. Reference symbol 4 denotes a cover or housing, in which two sources 5, 6 of electromagnetic radiation are arranged at a distance from each other. A position-sensitive detector 7, that is, a detector that detects the position of an incident beam, as will be described later, is arranged centrally between the sources 5, 6. The sources of electromagnetic radiation 5, 6 and the position-sensitive detector 7 are part of an integrated current circuit in which the sources are modulated to be activated with a phase displacement, that is, they are activated alternately. Laser sources or laser diodes may be used as sources. Such sources are in themselves well-known, as are position-sensitive radiation detectors, just as the connections between them that are specified here constitute an obvious connection circuit for one skilled in the arts. A convex lens 8 may be arranged on the outside of each source 5 and 6 and on the outside of the radiation detector 7.

The source 5 for electromagnetic radiation emits a radiation beam or cone of beams 9, and the source 6 of electromagnetic radiation emits in the same way a radiation beam or cone of beams 10. In order to make the picture clear, it must be appreciated that at any moment only one of the radiation beams 9 or 10 is activated at any moment in this way. The frequency at which the light sources may be modulated to be activated may, for example, be 100 Hz. The dashed lines 11 in FIG. 2 specify the central axes of the radiation beams 9 and 10. The dotted/dashed line 12 shown in FIG. 1 and in FIG. 2 for the purposes of explanation and simplification denotes the plane of the right-hand side of the vehicle 2, which faces the first vehicle 1. This side of the vehicle 2 is assumed in the example to be that side which reflects the radiation beams 9 and 10, as will be described later. As is probably best made clear by FIG. 1, the second vehicle 2 will move through or cut the radiation beams 9 and 10, at an angle α in the example shown, which angle in practice can lie between approximately 15° and 25°.

When the reflecting part of the vehicle 2 penetrates the radiation beam 9 from the left in FIG. 2, that is, when it is located within the area marked by B, beams reflected to the position-sensitive detector 7 will be registered only from the radiation beam 9. The detector is modulated such that no signal is emitted in this case. When the reflecting part of the second vehicle 2 penetrates the area in which the radiation beams 9 and 10 intersect each other, which area is shown hatched in FIGS. 1 and 2, the reflected beams will be detected in the radiation detector arising from both sources 5 and 6, whereby a signal is emitted, processed and transformed into, for example, a flashing light that is visible to the driver.

Assume that if the second vehicle 2 and its reflecting part are located at point a in FIG. 2, the reflected beams will take the pathway 13 shown dashed and will be detected by the position-sensitive radiation detector at the point a'. If the second vehicle 2 continues in a forward direction relative to the first vehicle 1 and the reflecting part of this vehicle 2 reaches point b, the reflected beam 14 will be detected at the detector 7 at point b', whereby the detector 7 emits during the motion of the beam from a' to b' a signal that is converted to, for example, a flashing light that is visible to the driver.

Thus, the reflected beam on the position-sensitive detector 7 has moved from point a' to point b' during the movement of the second vehicle 2 from point a to point b. The positions of the reflected beam detected during the movement of the beam from a' to b' are converted to signals for a board or panel that specifies positions and that is clearly visible to the driver, on which the driver receives information concerning the position of the second vehicle relative to his or her own by means of lamps, symbols or similar. It is, of course, possible for the positions of the reflected beams between a' and b' to be detected and the subsequent signals processed so that, for example, a lamp specifies only that a vehicle is located in the area of the "blind spot".

In that two alternating beams, which are reflected from an object to the detector, are required in order for the detector to emit the correct signals, only the area that is specified by hatching in FIGS. 1 and 2 will constitute the "detection area". The extent of the hatched area can be determined by varying the angles of the radiation beams and the angle of intersection between them, such that the greatest possible efficiency can be achieved with the device. The design of the device ensures that all background disturbance, background noise is efficiently minimized or eliminated, while the effective detection zone of the device is limited in space.

Figure 3:
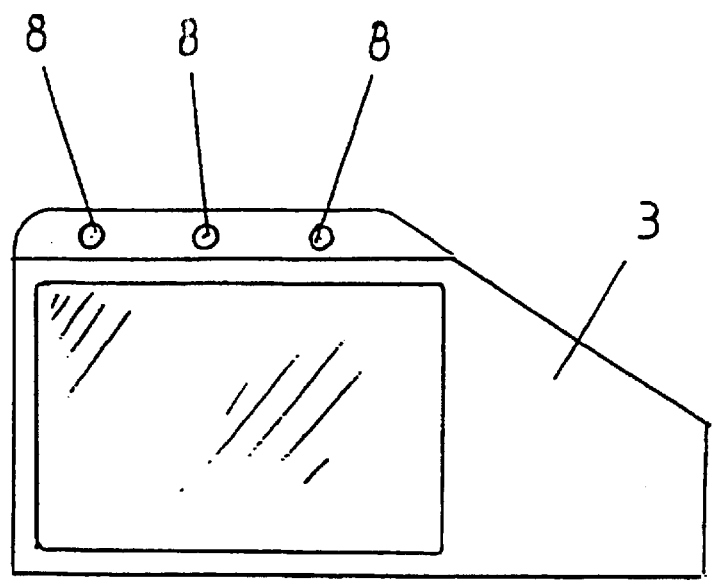
FIGS. 3 and 4 show examples of two different possibilities according to the prior art for fitting the warning device onto an outer rear-view mirror for a vehicle.
Figure 4:
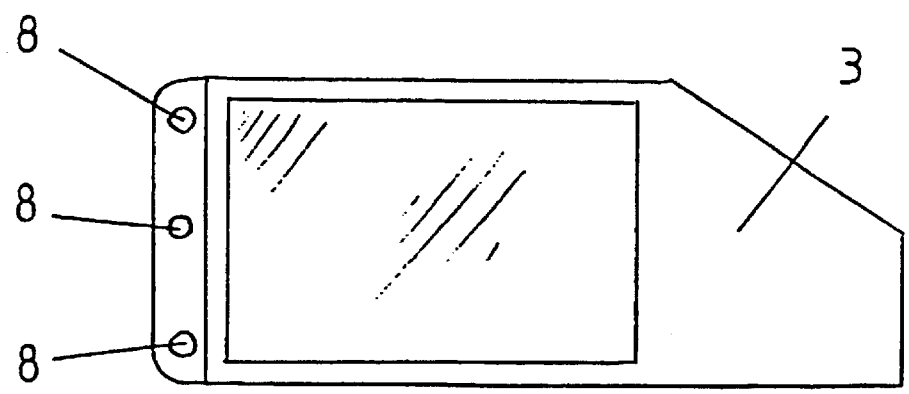

Examples of two different installations on an outer rear-view mirror for a vehicle are shown in FIGS. 3 and 4. FIG. 3 shows the device 4 applied on top of the mirror, and FIG. 4 shows the device 4 applied vertically along the side of the mirror. The device according to the invention can be produced as an accessory to existing rear-view mirrors, or it can, of course, be integrated in such mirrors during new production. The lamp or lamps that are to attract the driver's attention to the fact that a vehicle is positioned diagonally behind his or her own vehicle by blinking can be arranged on the rear-view mirror in association with the present warning device or it/they may be inside the car. The first case would be the most appropriate since the driver must in any case look into the rear-view mirror. It is also possible to use audible signals.

Figure 5:
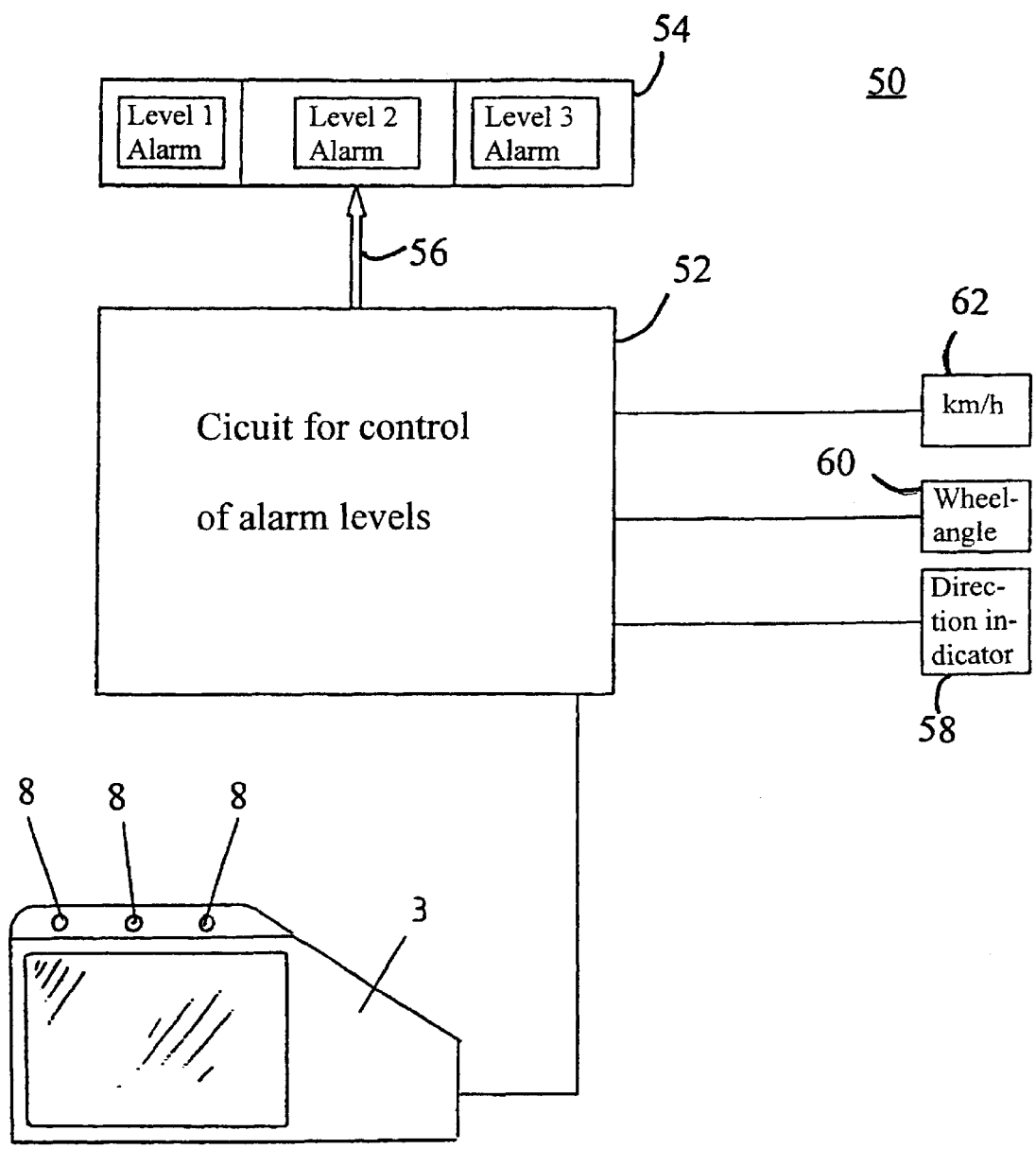
FIG. 5 shows in a schematic block-diagram form a warning device according to the present invention.

FIG. 5 shows schematically in the form of a block diagram a warning device 50 according to the present invention. The device 50 comprises an electronic circuit 52 for control of alarm levels; level 1, level 2, level 3, according to the embodiment in FIG. 5. The alarm levels attract the attention of the driver of a vehicle to critical conditions, for example, objects such as another vehicle in the blind spot area, by a display 54 with flashing lights of different colors or frequencies and/or different audible signals.

The warning device is shown here in the form of several units for obtaining a better overview, but one embodiment of the invention includes the containment of the warning device 50 in a rear-view mirror 3. The rear-view mirror 3 also includes in one extension of the invention batteries to drive the device 50 or connections in order to connect easily the current supply of a vehicle to the mirror 3. Older vehicles can thus in this way also be supplemented with a warning device according to the present invention.

The mirror comprises in one embodiment the devices that have been described above according to the prior art, for example, radiation or sound source, detector, etc. The reference symbol 8 in FIG. 5 shows, as has been described, lenses for concentrating light from radiation sources that lie behind them, and a lens for a detector of reflected light.

The circuit 52 has a signal bus 56 or similar connected to the display 54 comprising a definite number of outputs for alarm levels depending on the number of functions for raising an alarm or warning signal.

Different warning signals are given according to the present invention depending on the input signals that sensors or sensor means for detection of direction indicators 58 on/off, wheel angle 60 (degree of turning of the steering wheel) and the measured speed 62 of the vehicle supply, as will be described in more detail in the remainder of this document.

Whenever a vehicle equipped with the warning device 50 detects an object in the blind spot, for example a vehicle, through the detector 7, alarm level 1 will be activated according to the prior art. In order to achieve an even more safe conduct of a vehicle with the device 50, the present invention specifies the use of a combination of input signals to the circuit 52 through sensor means 58, 60, 62. In this way, a level 1 alarm is combined with input signals from direction indicators, angle of deviation of the wheel or steering wheel and the speed of the vehicle according to predetermined parameters such that at least one further alarm level, level 2, is activated and, possibly, several further levels, such as alarm level 3. In this way the driver of a vehicle can be warned more effectively in that further light- and/or audible indications in a manner of speaking "awaken" the driver, even if he or she attempts to change lanes or commence an overtaking maneuver in spite of alarm level 1.

In the following, a preferred embodiment follows for the purposes of providing an example, as does one of many other possible such embodiments.

As has been described above, alarm level 1 is always given on detection of an object in a position that is critical or partially critical for the driver. In addition to this, warning signals are emitted in the present embodiment for the detection of direction indicator on, alarm level 2, wheel deviation measured in terms of, for example, angle, level 3 alarm, and consideration of the speed of the vehicle relative to predetermined threshold values depending on the traffic situation.

If the vehicle equipped with the warning device 50 travels at a speed that lies under 60 km/h, an input signal from sensor device 58, 60 involves the activation of alarm level 2 and this alarm being made visible for the driver on the display 54, possibly combined with an audible alarm.

However, alarm level 2 is not emitted if the angle of deviation of the wheels is greater than 30°, in this case it is assumed that the vehicle is turning to the right or left in, for example, a road junction. The same occurs if the speed of the vehicle lies under, for example, 15 km/h since it is not desirable that the alarm is given during, for example, crawling during rush-hour driving.

Numerical examples of speeds and angles of deviation for the wheels are predetermined and can be modified for different traffic situations.

If the speed of the vehicle is detected as lying above 60 krn/h, alarm level 2 is activated when the direction indicator is detected as being on, and alarm level 3 on deviation of the wheel angle.

Other conditions for the activation of an alarm than those given above are, of course, possible for one skilled in the arts when considering the scope of the attached claims.

The detector 7 in one embodiment is arranged on the rear section of the vehicle. The detector is according to one embodiment arranged in a rear-view mirror and a further detector is arranged on the rear section of a vehicle, where the detectors collaborate in order to detect reflected signals that are received.

A further embodiment includes the arrangement of at least one detector on the side section of a vehicle for detection of reflected signals.

A further embodiment specifies the arrangement of at least one detector on the side section of a vehicle for the detection of reflected signals.

The vehicle in one embodiment with detectors arranged on the side- or rear sections of the vehicle is a truck, heavy goods vehicle or similar.

The present invention has been described here using specific embodiments and examples, but is not for that reason limited to these. It is instead the extent of the attached claims that specify further embodiments for one skilled in the arts within the present technical area.

What is claimed is:

1. A warning device for a motor vehicle having at least one direction indicator and wheel in order to attract the attention of a driver when an object is located in a position that is critical for the driver, the device comprises:
   (a) at least one source of wave energy;
   (b) an arranged position-sensitive wave energy detector for detecting an object in a position that is critical for the driver;
   (c) an output for activating a warning signal when the wave energy detector detects an object located in a position critical for the driver;
   (d) a direction indicator sensor for detection of an input signal from the at least one direction indicator of the vehicle indicating that the at least one direction indicator is on;
   (e) an output for activating a warning signal when both the direction indicator sensor detects the input signal of the at least one direction indicator is on and when the wave energy detector detects an object located in a position critical for the driver;
   (f) an angular sensor deviation for detecting angular deviation of the at least one wheel of the vehicle;
   (g) an output for activating a warning signal when both the angular deviation sensor detects at least a certain angular deviation of the at least one wheel and the wave energy detector detects an object located in a position critical for the driver;
   (h) speed sensor for detecting the speed of the vehicle;
   (i) an output for activating a warning signal when the speed sensor detects speed over predetermined threshold values of speed and the wave energy detector detects an object located in a position critical to the driver in combination with at least one input signal from at least one of the direction indicator sensor and the angular deviation sensor; and
   (j) threshold detection means for a maximum allowed angular deviation in order for the warning device to be active, which indicates rounding of a curve or normal turning of the vehicle.

2. The warning device according to claim 1, wherein the warning signal achieved when the direction indicator sensor detects the input signal that the at least one direction indicator is on and the wave energy detector detects an object located in a position critical to the driver is a further level of signal.

3. The warning device according to claim 1, wherein the warning signal achieved when the angular deviation sensor detects at least a certain angular deviation of the at least one wheel and the wave energy detector detects an object located in a position critical to the driver is a further level of signal.

4. The warning device according to claim 1, wherein the warning signal when the speed sensor detects speed over the predetermined threshold values of speed and the wave energy detector detects an object located in a position critical to the driver in combination with at least one input signal from at least one of the direction indicator sensor and the angular deviation sensor is a further level of signal depending on speed detection as compared with the predetermined threshold values.

5. The warning device according to claim 4, wherein, if the speed sensor detects speed of the vehicle lying below a predetermined maximum speed, the further level is activated for change of lane or overtaking through the input signal from the angular deviation sensor.

6. The warning device according to claim 5, wherein the further level is activated if the detection of angular deviation lies above a predetermined angle when the speed lies above a predetermined minimum speed.

7. The warning device according to claim 4, wherein, if the speed of the vehicle lies above a predetermined maximum speed, the further level is activated when the direction indicator sensor detects that the input signal indicating that the at least one direction indicator is on.

8. The warning device according to claim 7, wherein the further level is activated when the angular deviation sensor detects an angular deviation.

9. The warning device according to claim 1, wherein the outputs for warning signals are deactivated when the speed sensor detects the vehicle travelling slower than a predetermined minimum speed.

10. The warning device according to claim 1, wherein the warning device is contained in a rear-view mirror of the vehicle.

11. The warning device according to claim 10, wherein the rear-view mirror contains a battery for operation of the warning device.

12. The warning device according to claim 1, wherein the wave energy detector is arranged on a rear section of the vehicle.

13. The warning device according to claim 1, wherein the wave energy detector is one detector arranged in a rear-view mirror and a further detector arranged on a rear section of the vehicle whereby the detectors collaborate in order to receive reflected wave energy.

14. The warning device according to claim 13, wherein the vehicle is a truck.

15. The warning device according to claim 13, wherein at least one of the detectors is arranged on a side section of the vehicle for reception of reflected wave energy.

16. The warning device according to claim 15, wherein the vehicle is a truck.

* * * * *